(12) United States Patent
Bailo et al.

(10) Patent No.: US 9,409,531 B1
(45) Date of Patent: Aug. 9, 2016

(54) VEHICLE INTERIOR PANEL WITH ADJUSTABLE LOCATOR

(71) Applicant: Faurecia Interior Systems, Inc., Auburn Hills, MI (US)

(72) Inventors: Brenton Bailo, Lake Orion, MI (US); Michael Twork, White Lake, MI (US); Stephen Jones, Commerce Township, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 2 days.

(21) Appl. No.: 14/630,013

(22) Filed: Feb. 24, 2015

(51) Int. Cl.
*B60R 13/02* (2006.01)

(52) U.S. Cl.
CPC ......... *B60R 13/02* (2013.01); *B60R 2013/0293* (2013.01)

(58) Field of Classification Search
CPC .................. B60R 13/02; B60R 2013/0293

USPC .............................................. 296/146.7, 39.1
See application file for complete search history.

(56) References Cited

U.S. PATENT DOCUMENTS

| 6,412,852 | B1 * | 7/2002 | Koa | ..................... B60R 13/0206 296/146.5 |
| 7,559,598 | B2 * | 7/2009 | Steelman | ............... B60J 5/0418 296/146.7 |

* cited by examiner

*Primary Examiner* — Joseph D Pape
(74) *Attorney, Agent, or Firm* — Reising Ethington P.C.

(57) ABSTRACT

A vehicle interior panel includes an adjustable locator. The adjustable locator is operable to move a panel body after the panel body is mounted to a vehicle body and enables alignment of an aesthetic feature line with a complimentary feature line of an adjacent vehicle interior panel. A post of the adjustable locator can engage a receiver of the vehicle body at a fixed location while a working surface of the adjustable locator exerts a force on a reaction surface of the panel body to move the panel body. The adjustable locator can include gear teeth, a cam surface, ratcheting features, an adjustment rotor, or any combination thereof.

15 Claims, 6 Drawing Sheets

VEHICLE INTERIOR PANEL WITH ADJUSTABLE LOCATOR

TECHNICAL FIELD

The present disclosure relates generally to vehicle interior panels with aesthetic features and, more particularly, to vehicle interior panels with aesthetic features that continue from one panel to another.

BACKGROUND

Vehicle interior panels typically include a decorative aspect, providing the passenger cabin of a vehicle with a desired aesthetic. Combinations of different types of materials, textures, shapes, tactile features, and visual features can be used with such panels to provide the passenger cabin with any of a variety of different ambiences, from luxurious to utilitarian. Modern materials can be shaped into complex contoured shapes and are used extensively in vehicle interiors due to the available design freedom. Cost-reduction activities and other innovations have enabled certain aesthetic features, such as authentic or simulated cut-and-sew features and multi-colored or multi-textured decorative surfaces, to be implemented in a wider range of vehicle interiors. When it is desired to include complimentary features on adjacent but separate interior surfaces, misalignment of the features can become visually noticeable and considered defective.

Solutions for visual defects related to the appearance of adjacent interior panels have generally been limited to addressing the width of the gap between panels. For instance, U.S. Pat. No. 8,282,145 to Vasko et al. discloses a vehicle interior panel assembly including first and second panels with interior and exterior surfaces. A gap is defined between opposing edges of the panels. Vasko suggests including a projection that extends from one of the panels at a position inward from the exterior surface and toward the edge of other panel to span at least a portion of the gap to hide components located behind the panels so that such components are not visible through the gap.

SUMMARY

In accordance with at least one embodiment, a vehicle interior panel for mounting to a portion of a vehicle body includes a panel body having an outer side and an opposite inner side. The outer side faces the interior of the passenger cabin of the vehicle when mounted to said portion of the vehicle body. The vehicle interior panel also includes a plurality of locators extending from the inner side of the panel body. The plurality of locators is arranged to engage a corresponding plurality of receivers of the vehicle body at a fixed location with respect to said portion of the vehicle body. The locators and receivers cooperate to locate the panel body with respect to said portion of the vehicle body. The plurality of locators includes an adjustable locator that includes a post and an adjustment mechanism coupled with the post. The post engages a respective one of the receivers, and the adjustment mechanism is operable to change the position of the post with respect to the panel body. The adjustment mechanism thereby changes the location of the panel body with respect to said portion of the vehicle body when mounted to said portion of the vehicle body.

In accordance with at least one embodiment, the adjustment mechanism includes a working surface, and the panel body comprises a reaction surface that forms an interface with the working surface. The working surface exerts a force on the reaction surface to translate the post with respect to the panel body in response to user-initiated movement of the working surface.

In accordance with at least one embodiment, the adjustment mechanism includes an adjustment rotor that includes the working surface. The working surface exerts a force on the reaction surface to translate the post with respect to the panel body in response to user-initiated rotation of the adjustment rotor.

In accordance with at least one embodiment, the working surface rotates about an axis of the post during operation of the adjustment mechanism.

In accordance with at least one embodiment, the vehicle interior panel includes a recess formed in the outer side of the panel body, and the working surface and the interface are located in the recess.

In accordance with at least one embodiment, the adjustment mechanism includes a gear coupled with the post. The gear is in contact with the panel body at an interface such that the gear exerts a force on the panel body at the interface to translate the post with respect to the panel body in response to rotation of the gear about an axis.

In accordance with at least one embodiment, the gear comprises teeth that provide a working surface and the panel body comprises a rack of teeth that provides a reaction surface that is in contact with the working surface at the interface.

In accordance with at least one embodiment, the adjustment mechanism includes a cam surface configured to rotate about an axis of the post such that rotation of the cam surface about the axis changes the distance from the axis to an interface between the cam surface and a reaction surface of the panel body.

In accordance with at least one embodiment, the post is attached to the adjustment mechanism at the outer side of the panel body and extends through a slot formed through the panel body to engage said respective one of the receivers. The post is translated along the slot during operation of the adjustment mechanism.

In accordance with at least one embodiment, opposing surfaces of the adjustable locator and the panel body include complimentary ratcheting features that maintain the post in a desired position with respect to the panel body by preventing movement of the adjustment mechanism below a threshold value of applied force.

In accordance with at least one embodiment, the adjustment mechanism includes an adjustment rotor and a threaded rod having threads that interact with the adjustment rotor to rotate the adjustment rotor about a first axis in response to rotation of the threaded rod about a second axis that is oriented in a different direction from the first axis. The post is attached to the adjustment rotor.

In accordance with at least one embodiment, the adjustment mechanism includes an adjustment rotor located at the inner side of the panel body and a remote actuator operatively coupled with the adjustment rotor. The remote actuator is accessible from the outer side of the panel body, and the post is attached to the adjustment rotor.

In accordance with at least one embodiment, the adjustable locator is a 4-way locator and is the only 4-way locator of the vehicle interior panel.

In accordance with at least one embodiment, the vehicle interior panel is a vehicle interior door panel. Said portion of the vehicle body is a portion of a vehicle door, and the vehicle interior door panel includes an aesthetic feature line at the outer side of the panel body that is visible from the passenger cabin of the vehicle. The adjustment mechanism is operable to translate the panel body when the interior door panel is mounted to said portion of the vehicle door and when the post is translated with respect to the panel body, thereby enabling alignment of the aesthetic feature line with a complimentary aesthetic feature line of an adjacent vehicle interior panel.

In accordance with at least one embodiment, a method of aligning complimentary aesthetic feature lines in the passenger cabin of a vehicle includes the steps of: (a) providing a vehicle interior panel comprising a panel body and an adjustable locator extending from an inner side of the panel body, wherein at least a portion of the adjustable locator has a variable position with respect to the panel body and the panel body includes an aesthetic feature line; (b) mounting the vehicle interior panel to a portion of a body of the vehicle and adjacent to another vehicle interior panel having a complimentary aesthetic feature line, wherein the adjustable locator engages a receiver at a fixed position with respect to said portion of the body of the vehicle; and (c) adjusting the location of the panel body with respect to said portion of the body of the vehicle by changing said variable position by an amount sufficient to align the complimentary aesthetic feature lines.

It is contemplated that the various features set forth in the preceding paragraphs, in the claims and/or in the following description and drawings may be taken independently or in any combination thereof. For example, features disclosed in connection with one embodiment are applicable to all embodiments, except where there is incompatibility of features.

BRIEF DESCRIPTION OF THE DRAWINGS

One or more embodiments will hereinafter be described in conjunction with the appended drawings, wherein.

DETAILED DESCRIPTION

Described below is a vehicle interior panel with an adjustable locator that enables alignment of complimentary feature lines of adjacent but separately mounted vehicle interior panels. The adjustable locator and method of using it are described below as part of a vehicle interior door panel that is vertically adjustable for alignment with features of an adjacent instrument panel. However, skilled artisans in possession of these teachings will understand the applicability to other types of vehicle interior panels, such as trim panels for vehicle pillars, instrument panels, storage compartment panels, instrument panels, seat panels, roof panels, etc. Further, movement and adjustment of the interior panel is not limited to the vertical direction and may include adjustment in the horizontal direction, some other direction, or more than one direction and can offer advantages other than feature alignment, such as inter-panel gap reduction or gap size consistency.

Figure 1:
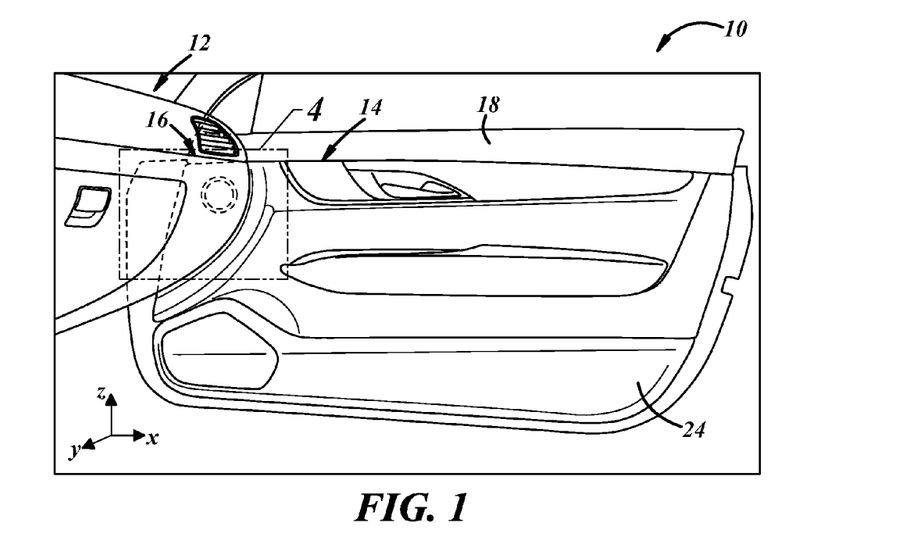
FIG. 1 is a front view of an illustrative vehicle interior panel as part of a vehicle door.

FIG. 1 illustrates one example of a vehicle interior panel 10 as viewed from the passenger cabin of the vehicle. This example is an interior door panel 10 mounted adjacent a vehicle instrument panel 12 as part of a vehicle door. Each of the panels 10, 12 includes a respective aesthetic feature line 14, 16 that is visible from the passenger cabin. The feature lines 14, 16 are each complimentary to the other and may be considered to form a visually continuous interior feature line when sufficiently aligned. Each of the feature lines 14, 16 may include stitching (e.g., sewn thread and/or simulated stitches), a boundary between different colors or textures, a sharp transition between different portions of each respective panel, or an edge of a trim piece of the respective panel, to name a few examples. Each of the feature lines 14, 16 can also be in the form of an imaginary line along which complimentary three-dimensional surfaces lie.

Figure 2:
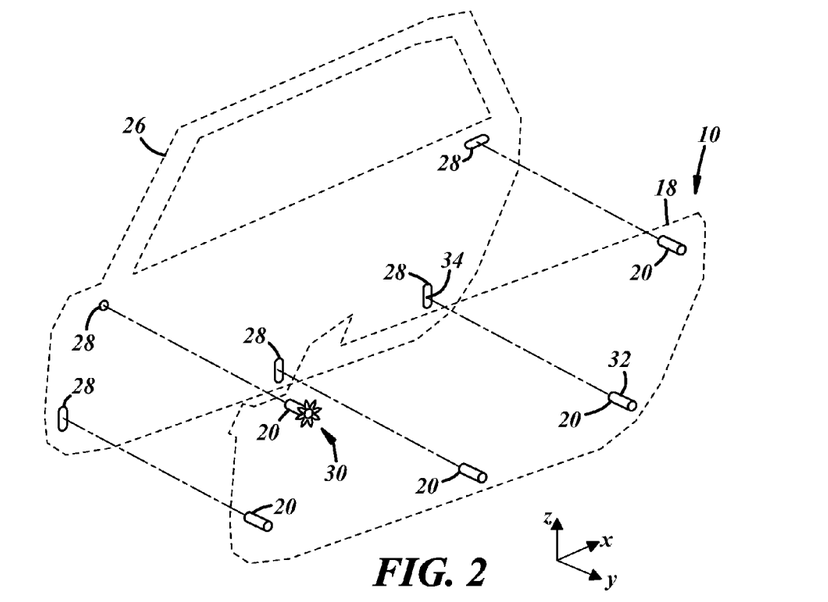
FIG. 2 is a schematic view of the vehicle interior panel in phantom outline with a plurality of locators arranged to engage a corresponding plurality of receivers.

With additional reference to the exploded view of FIG. 2, the panel 10 includes a panel body 18 and a plurality of locators 20 extending from an inner side 22 (not labeled in FIGS. 1 and 2) of the panel body. The panel body 18 is shown in phantom outline in FIG. 2 in order to illustrate the locators 20. The inner side 22 of the panel body 18 is opposite an outer side 24 that faces toward the interior of the passenger cabin in FIG. 1. A portion of the outer side 24 is decorative and visible from the passenger cabin and includes the feature line 14. A portion of the vehicle body, in this case a vehicle door 26, includes a corresponding plurality of receivers 28, each at a fixed location with respect to the remainder of the door. The vehicle door 26 is also shown in phantom to illustrate exemplary locations for the receivers 28. The locators 20 and receivers 28 cooperate in pairs to locate the panel body 18 with respect to the door 26 in the vertical (z) and longitudinal (x) directions in this example, by restricting movement in those directions. When more than one pair of locators 20 and receivers 28 is engaged, rotational movement of the panel body 18 (i.e., in the x-z plane of FIGS. 1 and 2) is also restricted. The locators 20 and receivers 28 may also serve to at least temporarily secure the panel 10 to the door 26.

At least one of the locators 20 is an adjustable locator 30, at least a portion of which has a variable position along the panel body 18. In the example of FIG. 2, the plurality of locators 20 includes one adjustable locator 30, and each of the other locators is a static locator with a fixed position relative to the panel body 18. The panel 10 may include more than one adjustable locator 30.

In the illustrated embodiment, each locator 20 includes a post 32 that engages the corresponding receiver 28 via an opening 34 formed through or in each receiver (only one post and corresponding opening are labeled in FIG. 2 for simplicity). Each locator 20 may be characterized as a 2-way locator or as a 4-way locator. In one example, a locator 20 with a generally cylindrical post 32 that engages a receiver 28 with a circular opening 34 is considered a 4-way locator when there is a snug fit between the outer surface of the post and the inside of the opening, with post movement being restricted in all radial directions, including four Cartesian directions—i.e., fore-aft and up-down (±x and ±z-directions). A locator 20 with a post 32 that engages a receiver 28 with a slot or elongated opening 34 is considered a 2-way locator when there is a snug fit between the outside of the post and the long sides of the slot, as post movement is radially restricted in only two of the four Cartesian directions—i.e., fore-aft or up-down (±x or ±z-directions).

In the example of FIG. 2, the adjustable locator 30 is a 4-way locator, and each of the other locators 20 is a 2-way locator with their respective posts 32 free to move up-and-down or fore-and-aft in the respective slotted receiver 28 when initially engaged. Other types of engagement are possible. For example, each locator 20 may include an opening that engages a post of the corresponding receiver 28, or each locator and receiver can include both a post and an opening. Each locator-receiver pair may also or alternatively include other complimentary and/or engaging features, such as snap-fits or clips.

In a particular embodiment, the panel 10 includes a 4-way locator at one corner or quadrant of the panel body and a 2-way locator elsewhere on the panel body. These two locators may be aligned either vertically (z-direction) or horizontally (x-direction). The additional locators may be configured with additional clearance to their respective receivers (e.g., the receivers may be oversized) to reduce, minimize, or eliminate interference with the cooperation of the 4-way locator and 2-way locator pair. In some cases, the panel can be over-constrained and include multiple 4-way and 2-way locators. For example, in embodiments where the panel body is relatively large and/or flexible, the first 4-way/2-way locator pair may not be effective in regions of the panel spaced too far from them.

Figure 3:
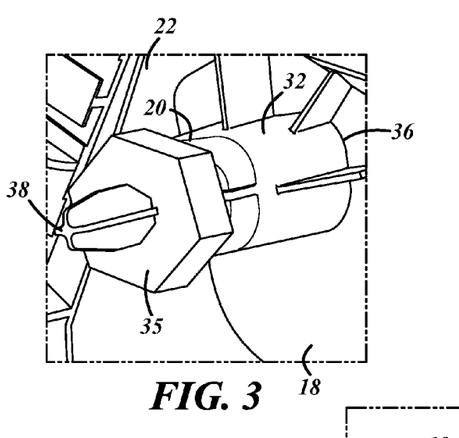
FIG. 3 is a perspective view of an example of a static locator at the inner side of the vehicle interior panel.

One example of a static locator 20 is illustrated in FIG. 3. The post 32 of the locator 20 extends from the inner side 22 of the panel body 18 from a base 36 to an end 38. Each locator 20 may also be configured to at least temporarily secure the panel 10 to the vehicle body. The illustrated locator 20 is configured to reversibly secure a portion of the panel body 18 to the door by engaging a corresponding opening or hole provided in the door, or other vehicle body portion, such as one of the receiver openings 34 (FIG. 2). In this example, the end 38 of the post 32 is received by an opening sized to have a tight fit with a portion of the locator 20, thus both locating and securing the illustrated portion of the panel body 18 to the underlying portion of the vehicle body. In the absence of other types of fasteners, this type of locator 20 allows easy installation and removal of the panel 10 by respectively pressing or pulling the panel toward or away from the vehicle body—i.e., in the transverse vehicle (y) direction for a door panel—and is useful to temporarily secure the panel to the vehicle body in a manufacturing environment with more aggressive or permanent fasteners (e.g., screws or bolts) subsequently added. Fasteners that cannot be easily removed by manual pulling may be used to further secure the panel 10 to the vehicle body at locations that are subjected to such forces during use, such as near the pull cup or grab handle of the panel.

The static locator 20 of FIG. 3 is an integral feature of the panel 10 and may be molded together with the panel body 18 as a single piece (e.g., via injection molding). A gasket or insulator 35 may be provided to isolate the remainder of the panel from each of the mounting locations along the vehicle body. Locators 20 may also be separately formed pieces attached to the panel body 18 by snap fit or other means. In some cases, the locator 20 includes an opening that a post or protrusion of the vehicle body fits into. The locator can also be configured to non-reversibly secure the panel body to the vehicle body, such as by employing undercut features that engage the vehicle body.

Figure 4:
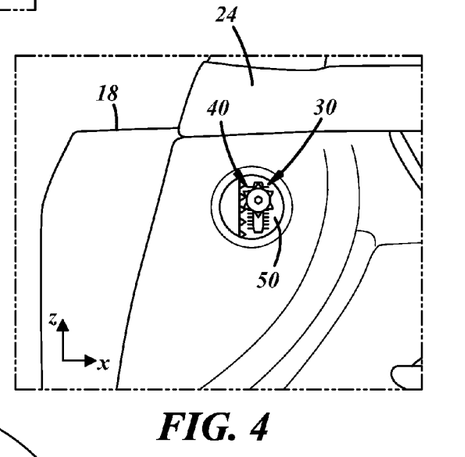
FIG. 4 is an enlarged view of a portion of FIG. 1 illustrating an example of an adjustable locator that includes a gear.
Figure 5:
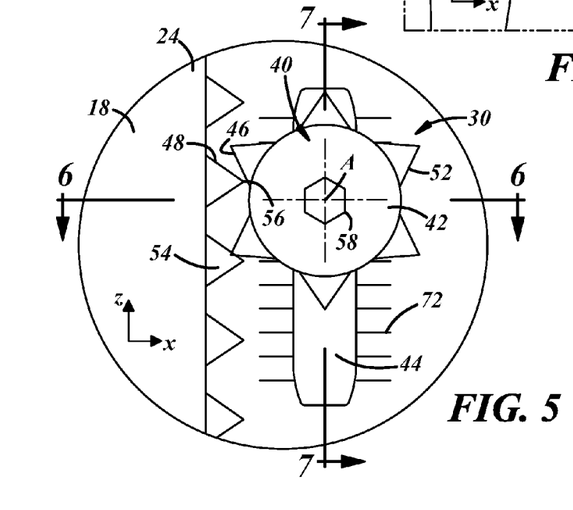
FIG. 5 is an enlarged view of a portion of FIG. 4.

In various embodiments, at least one of the locators is an adjustable locator, several examples of which are described below. FIGS. 4 and 5 are enlarged views of a portion of FIG. 1, with the instrument panel 12 omitted, illustrating one example of the adjustable locator 30. The adjustable locator 30 includes an adjustment mechanism 40 coupled with the post 32 (not visible in FIGS. 4 and 5) that is operable to change the position of the post along the panel body 18 and, more specifically, the position of the post 32 along the inner side of the panel body. The adjustment mechanism 40 includes a post translator 42, which is in the form of a gear in this example, and is located at the outer side of 24 of the panel body 18. The post translator 42 is operable to cause translational movement between the post 32 and the panel body 18. The post extends from the gear 42 through a slot 44 in the panel body 18 and protrudes from the inner side 22 to engage the underlying portion of the vehicle body. The illustrated gear 42 includes a working surface 46 that exerts a force on a reaction surface 48 of the panel body 18 to translate the post with respect to the panel body in response to user-initiated movement of the gear 42. In particular, the position along the panel body 18 of the illustrated gear 42 and post 32 with which it is coupled is variable in the vertical (z) direction such that there is relative movement between the post and panel body in the z-direction when the gear 42 is turned.

In the illustrated embodiment, the gear 42 is located in a recess 50 at the outer side 24 of the panel body 18. The post translator 42 and/or recess 50 may be included along a portion of the panel body 18 that is concealed during normal vehicle use, as shown in FIG. 1, or elsewhere along the panel body. In the example of FIG. 1, the adjustable locator 30 is located such that it is not accessible or visible when the vehicle door is closed but is accessible when the vehicle door is open.

The post translator 42 in this and the other illustrated examples may be referred to as an adjustment rotor, as it is configured to change the position of the post 32 along the panel body in response to user-initiated rotation in these examples. Non-rotating post translators are also contemplated. The gear 42 of FIGS. 4 and 5 includes external teeth 52 arranged about its perimeter. The gear 42 moves along a corresponding rack of teeth 54 provided by the panel body 18, in this case at the outer side 24 of the panel body and in the recess 50. The teeth 52 provide the working surface 46 of the gear 42, and the teeth 54 provide the reaction surface 48 of the panel body 18. When the gear 42 undergoes user-initiated movement—rotation about an axis A, in this example—the working surface 46 exerts a force on the reaction surface 48 of the panel body 18 at an interface 56 and causes relative translational movement between the concentric coupled post 32 and the panel body, thereby changing the position of the post along the panel body.

In the illustrated example, the adjustable locator 30 and associated post 32 is translated in the positive z-direction with respect to the panel body 18 when the gear 42 rotates in a first or counter-clockwise direction and is translated in the negative z-direction with respect to the panel body 18 when the gear 42 rotates in an opposite second or clockwise direction. When the panel 10 is not attached to the vehicle body, the adjustable locator 30 is free to move up and down along the slot 44 when the gear 42 is rotated respectively counterclockwise and clockwise. When the panel 10 is mounted to the vehicle body such that the position of the rotational axis A is fixed in the manner of a 4-way locator, the co-acting working and reaction surfaces 46, 48 operate to translate the panel body 18 with respect to the vehicle body. In the illustrated example, clockwise rotation of the adjustment rotor 42 thus results in upward movement of the panel body 18 when installed in the vehicle, and counter-clockwise rotation of the adjustment rotor results in downward movement of the panel body. A tool interface 58, such as the illustrated hex opening, may be provided to accommodate user-initiated movement.

The adjustable locator 30 thereby enables alignment of the above-described aesthetic feature lines, such as feature lines 14, 16 of FIG. 1. In a vehicle assembly operation, for example, the panel 10 can be secured to the vehicle door by an assembly operator via the plurality of locators 20 extending from the inner side of the panel, including the adjustable locator 30. Further along the assembly line, other more permanent fasteners such as sheet metal screws can be driven through openings in the panel 10 to more firmly secure the panel to the door. Prior to application of such additional fasteners, an operator can adjust the location of the panel body 18 via the adjustment mechanism 40 to align the complimentary feature lines of the panel 10 and an adjacent interior panel.

In the case of the illustrated interior door panel 10, visual alignment may be most noticeable with the vehicle door closed. Indicia or other markings may be included that are visible to the operator at the outer side 24 of the panel body 18 to indicate the amount of movement of the post of the adjustable locator while the operator is turning the adjustment rotor or otherwise operating the adjustment mechanism. In this manner, alignment of the complimentary feature lines of adjacent panels can be assessed with the vehicle door closed, an amount of necessary adjustment can be determined, and the door can be opened to access the adjustment mechanism to move the locator post by the necessary amount for alignment before driving sheet metal screws or other fasteners through the panel to secure the panel at its final location with respect to the underlying portion of the door. As is apparent in this example, the adjustable locator 30 may also be useful for adjustment by vehicle service departments or dealership personnel if necessary.

Figure 6:
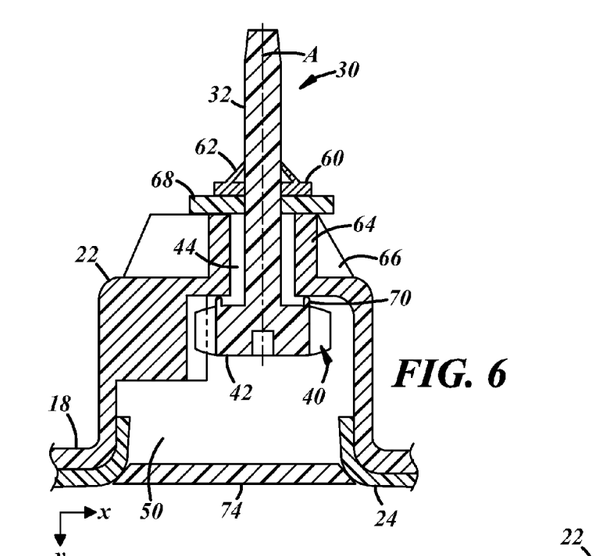
FIG. 6 is a top cross-sectional view of the adjustable locator of FIGS. 4 and 5.
Figures 7, 8:
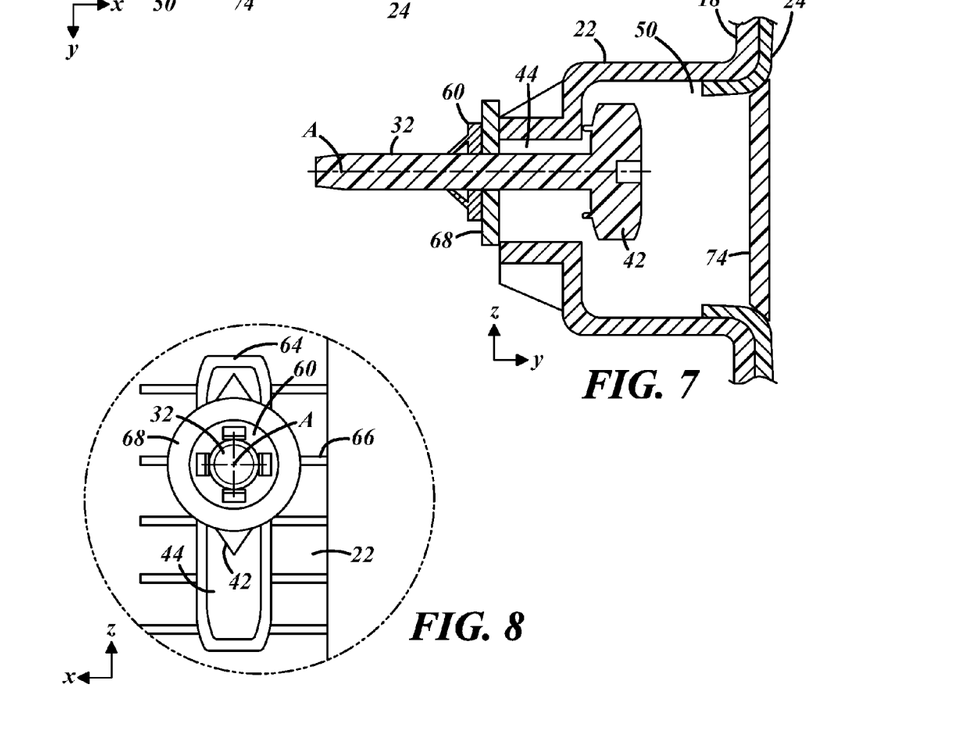
FIG. 7 is a side cross-sectional view of the adjustable locator of FIGS. 4 and 5.
FIG. 8 is a rear view of the adjustable locator of FIGS. 4 and 5.

FIGS. 6-8 are additional views of the adjustable locator 30 of FIGS. 4 and 5, illustrating certain other useful features. FIGS. 6 and 7 are respective top and side cross-sectional views, and FIG. 8 is a rear view showing the inner side 22 of the panel body 18. As shown, the post 32 and/or the adjustable locator 30 may be secured to the panel body 18 by a clip 60 or other fastener in a manner that accommodates limited post movement. In this case, the clip 60 is a one-way press-on clip with teeth or barbs 62 that engage the post 32 when the clip is installed. This clip 60 can be pressed on to the post 32 from the inner side 22 of the panel body to provide a suitable clamp load on the panel body 18 between the clip and the gear 42. In this case, the slot 44 is provided in an elongated boss 64 extending from the inner side 22 of the panel body, and the clamp load is applied at the boss. Reinforcement ribs 66 are provided along the sides of the illustrated boss 64.

An optional slider 68 may also be provided between the clip 60 and the panel body 18, as shown, to provide the clamping surface at the inner side 22 of the panel body. The slider 68 may have a smooth surface in contact with the panel body and/or may be fabricated from a low friction material such as acetal or PTFE. The slider 68 may facilitate a higher clamp load while allowing sufficient post movement along the slot 44, whereas a high friction material or rough interfacing surface would require a lower clamp load to accommodate post movement in response to rotation of the gear 42.

Opposing surfaces of the adjustable locator 30 and the panel body 18 may include respective and complimentary ratcheting features 70, 72 that maintain the adjustable locator 30 and or post 32 in a desired position with respect to the panel body by preventing movement of components of the adjustment mechanism 40 below a threshold value of applied force. In the illustrated example, short nibs 70 protrude from the back of the gear 42 as ratcheting features that are complimentary to adjustment ribs 72 (FIG. 5) provided on the panel body. The complimentary features are sized and spaced so that a threshold force, in this case a rotational force or torque, is required to move the opposing ratcheting features past one another. The ratcheting features 70, 72 can also serve to provide audible or tactile feedback to the user to provide an indication that the adjustable locator 30 has moved to the next available position along the slot 44. For example, each click of the ratcheting features may indicate ½ mm or some other known amount of vertical movement of the panel body 18. An optional cap or dust cover 74 may also be provided to conceal and/or protect the adjustable locator and/or its components.

Figures 9, 10, 15:
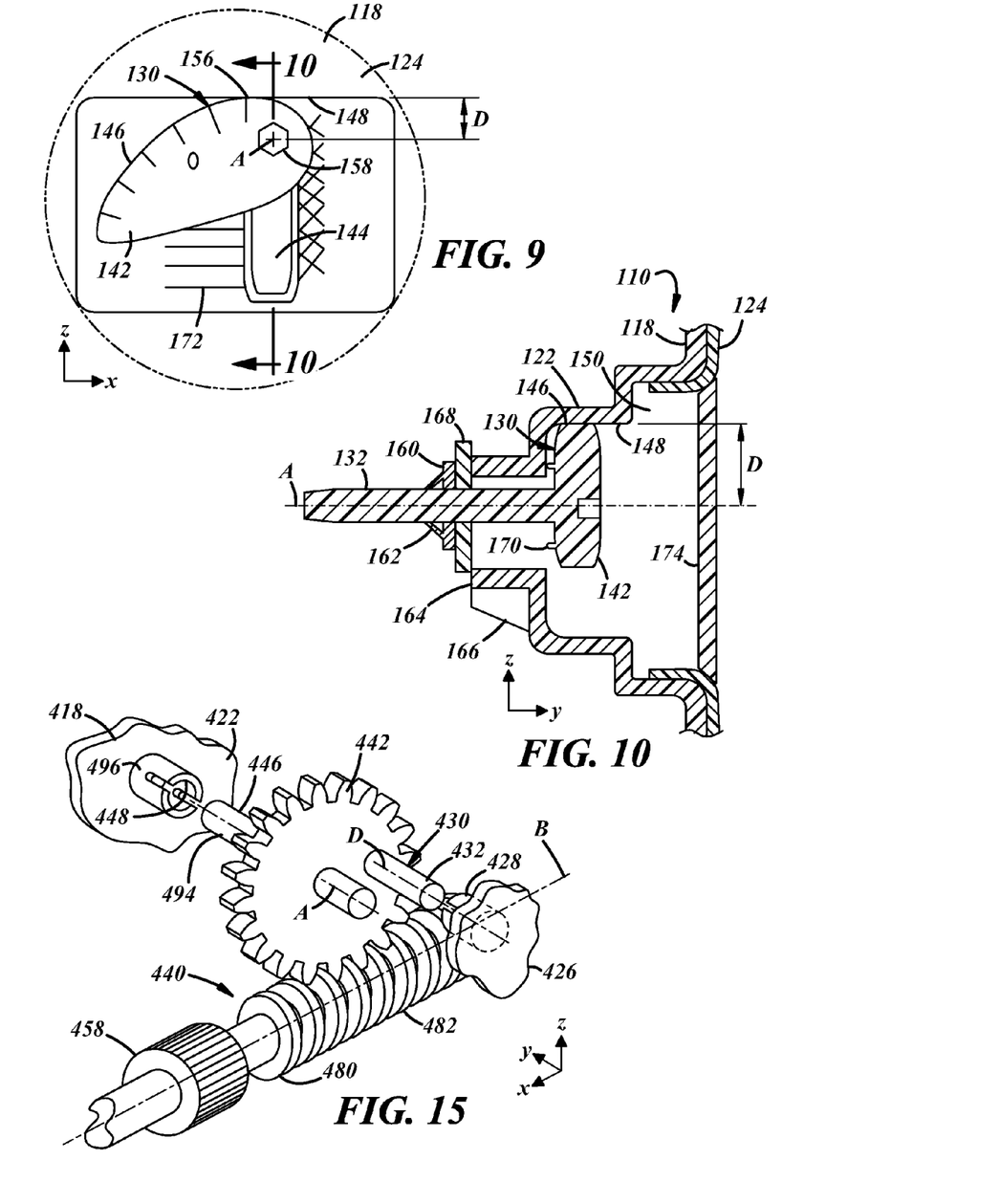
FIG. 9 is a front view of another example of the adjustable locator that includes a cam surface.
FIG. 10 is a side cross-sectional view of the adjustable locator of FIG. 9.
FIG. 15 is an exploded view of another example of the adjustable locator that includes a gear.

FIGS. 9 and 10 illustrate another example of the adjustable locator 130, with a front view of the locator showing the outer side 124 of the panel body 118 in FIG. 9 and a side cross-sectional view of the locator in FIG. 10. The adjustable locator 130 of FIGS. 9 and 10 is situated similarly to the example of FIGS. 4-8 in that the adjustment rotor 142 is coupled with the post 132 at the outer side of 124 of the panel body 118 and is located in recess 150. The post 132 extends through the slot 144 in the panel body 118 and protrudes from the inner side 122 of the panel body to engage the underlying portion of the vehicle body.

The illustrated adjustment rotor 142 is another example in which the working surface 146 and the post 132 rotate about the same axis A. In this embodiment, the working surface 146 is a cam surface shaped such that rotation of the adjustment rotor 142 changes a distance D from the rotational axis A to the interface 156 between the working surface 146 and the reaction surface 148. When the adjustment rotor 142 rotates in at least one direction, the working surface 146 exerts a force on the reaction surface 148 and translates the post 132 along the panel body 118, thereby changing the position of the post with respect to the panel body.

In the example of FIGS. 9 and 10, and with the adjustment rotor 142 in the illustrated orientation, the adjustable locator 130 is translated in the negative z-direction with respect to the panel body 118 when the adjustment rotor 142 rotates clockwise, due to the increased distance D. Unlike the working surface of the gear 42 in the previous example, which is shaped such that force can be applied against the reaction surface in both directions (±z), the cam surface 146 can only apply force to the reaction surface 148 in one direction. When the panel 110 is mounted to the vehicle body such that the position of the rotational axis A is fixed with respect to the underlying vehicle body in the manner of a 4-way locator, the co-acting working and reaction surfaces 146, 148 operate to translate the panel body 118 with respect to the vehicle body, with clockwise rotation of the adjustment rotor 142 thus resulting in upward movement of the panel body 118. Counter-clockwise rotation of the adjustment rotor 142 results in downward movement of the panel body 118 under the force of gravity or some other downward force (e.g., a biasing force) not provided by the working surface 146. The cam surface 146 can be configured such that the distance D varies with respect to the amount of rotation of the adjustment rotor 142 either linearly or non-linearly. This example also includes a hex tool interface 158 that accommodates user-initiated movement of the rotor 142.

Other features of the example of FIGS. 9 and 10 are common with those of the previous example of FIGS. 4-8. The adjustment rotor 142 is secured to the panel body 118 by a clip 160 that includes barbs 162 that engage the post 132 and provides a suitable clamp load between the clip and the adjustment rotor 142, with the clamp load applied to the boss 164 on the inner side 122 of the panel body 118 and with reinforcement ribs 166 provided along the sides of the boss 164. A slider 168 is provided between the clip 160 and the boss 164 and may facilitate a higher clamp load while allowing sufficient post movement along the slot 144, as noted above. Opposing surfaces of the adjustable locator 130 and the panel body 118 include respective and complimentary ratcheting features 170, 172 that maintain the adjustable locator 130 and/or post 132 in the desired position with respect to the panel body by preventing movement below a threshold value of applied force. The ratcheting features include short nibs 170 that protrude from the back of the rotor 142 and adjustment ribs 172 provided on the panel body 118. An optional cap 174 is shown in FIG. 10 that conceals and/or protects the adjustable locator and/or its components.

Figure 11:
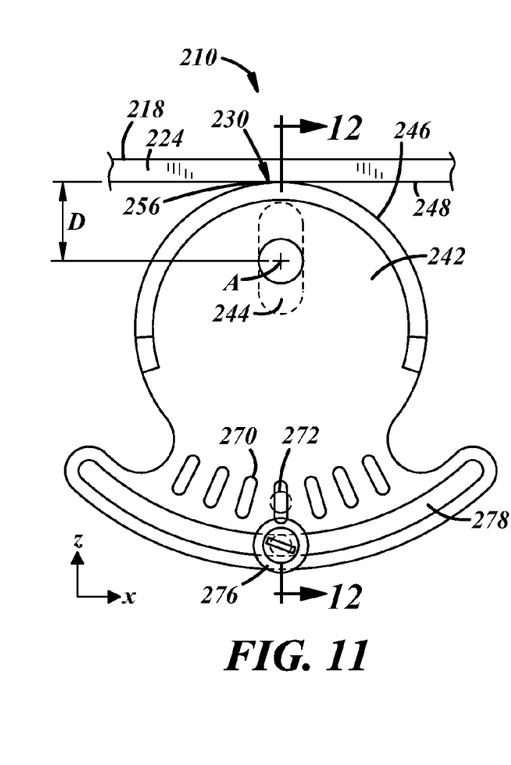
FIG. 11 is a front view of another example of the adjustable locator that includes a cam surface.
Figure 12:
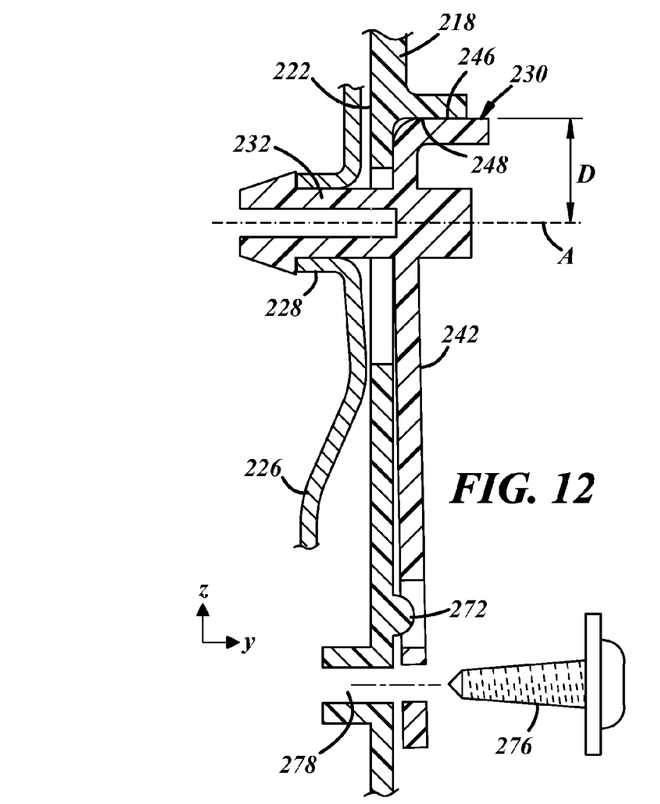
FIG. 12 is a side cross-sectional view of the adjustable locator of FIG. 11.

FIGS. 11 and 12 illustrate another example of the adjustable locator 230, with a front view from the outer side 224 of the panel body 218 in FIG. 11 and a side cross-sectional view in FIG. 12. The adjustable locator 230 of FIGS. 11 and 12 is situated similarly to the previous examples in that the adjustment rotor 242 is coupled with the post 232 at the outer side of 224 of the panel body 218, with the post extending through the slot 244 in the panel body 218 and protruding from the inner side 222 of the panel body to engage the underlying portion 226 of the vehicle body by way of the receiver 228.

The illustrated adjustment rotor 242 is another example of an adjustment rotor where both the working surface 246 and the post 232 rotate about the same axis A. In this embodiment, the working surface 246 is a cam surface shaped such that rotation of the adjustment rotor 242 changes a distance D from the rotational axis A to the interface 256 between the working surface 246 and the reaction surface 248. When the adjustment rotor 242 rotates in at least one direction, the working surface 246 exerts a force on the reaction surface 248 and translates the post 232 along and with respect to the panel body 218, thereby changing the position of the post with respect to the panel body.

With the adjustment rotor 242 in the illustrated orientation, the post 232 is translated in the negative z-direction with respect to the panel body 218 when the adjustment rotor rotates either clockwise or counter-clockwise, due to the resulting increase in the distance D. Like the cam surface 146 of the previous example, the cam surface 246 can only apply force to the reaction surface 248 in one direction and can be configured such that the distance D varies linearly or non-linearly with adjustment rotor angle. When the panel 210 is mounted to the vehicle body such that the position of the rotational axis A is fixed with respect to the underlying vehicle body in the manner of a 4-way locator, the co-acting working and reaction surfaces 246, 248 operate to translate the panel body 218 with respect to the vehicle body. In this example, the direction of movement of the panel body 218 with respect to the underlying body portion 226 when the adjustment rotor is rotated depends on the angular orientation of the adjustment rotor when rotation commences. In the illustrated angular orientation, the distance D will increase with either clockwise or counter-clockwise rotation, resulting in upward movement of the panel body 218. At other starting orientations, panel body movement would be upward with one direction of rotation and initially downward (under the force of gravity or some other downward force not provided by the working surface 246) with an opposite direction of rotation.

The adjustment rotor 242 in this example is secured to the panel body 218 by a fastener 276 or other type of post that extends through an opening 278 in the rotor 242. The fastener 276 is fixed to the panel body 218 at the outer side 224 of the panel body. For example, the fastener 276 may be a self-tapping screw, as shown. In addition to attaching the adjustment rotor 242 to the panel body 218, the illustrated fastener 276 functions as a guide for rotation of the adjustment rotor 242 and can share the load of the weight of the panel body 218 with the post 232. The fastener 276 can also function to help reversibly secure the rotor 242 in the desired final orientation. Alternatively or additionally, other types of fasteners may be employed, such as the previously described clips or other fastening means that may engage the post 232.

Opposing surfaces of the adjustable locator 230 and the panel body 218 include respective and complimentary ratcheting features 270, 272 that maintain the adjustable locator 230 and/or post 232 in the desired position with respect to the panel body by preventing movement of the rotor 242 below a threshold value of applied force. The ratcheting features in this example include slots or openings 270 formed at least partly through rotor 242, along with a corresponding protrusion 272 on the panel body 218. In this arrangement, each slot 270 may correspond to a particularly amount of post and panel body movement from a starting location when engaged with the protrusion 272.

Figure 13:
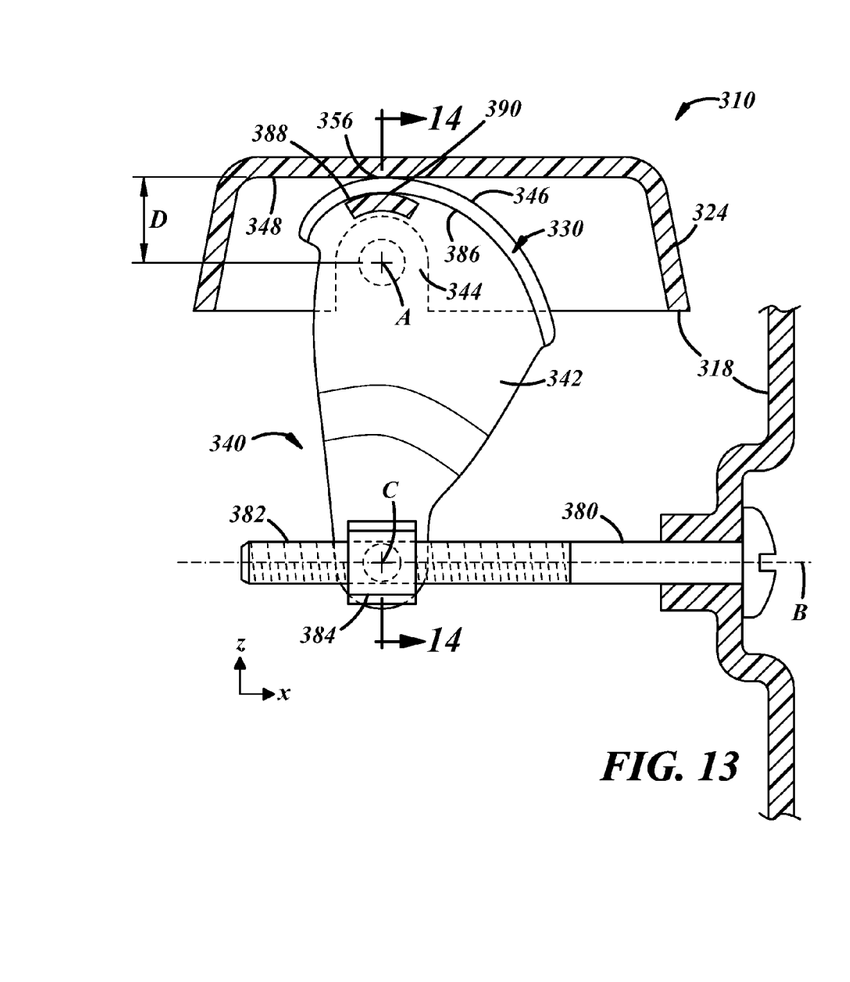
FIG. 13 is a front view of another example of the adjustable locator that includes a remote actuator.
Figure 14:
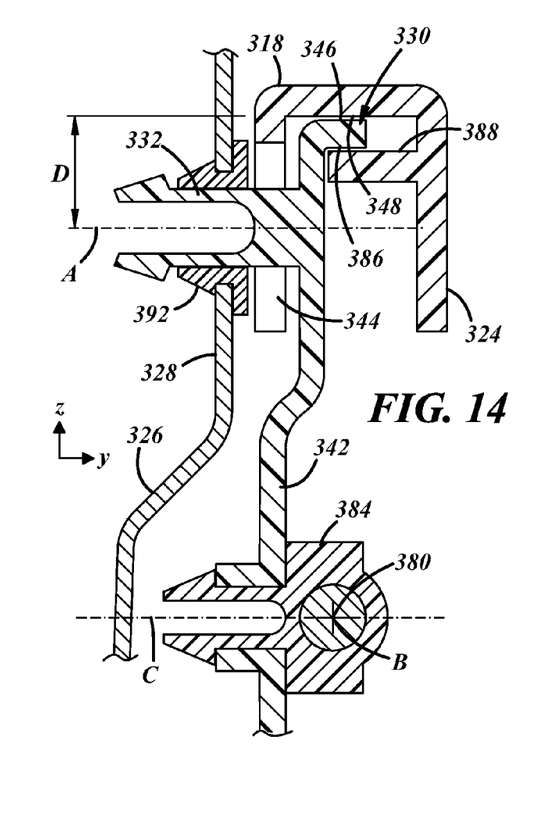
FIG. 14 is a side cross-sectional view of the adjustable locator of FIG. 13.

FIGS. 13 and 14 illustrate another example of the adjustable locator 330, with a front view from the outer side 324 of the panel body 318 in FIG. 13 and a side cross-sectional view in FIG. 14. In this example, the adjustment mechanism 340 includes components in addition to the rotatable adjustment rotor 342. The adjustment rotor 342 and the working surface 346, illustrated as another example of a cam surface, rotate about the same axis A in response to user-initiated movement. In this example, however, the adjustment mechanism 340 also includes a remote actuator 380 that is operatively coupled with the adjustment rotor 342. The user interacts with the remote actuator 380 to cause rotation of the rotor 342. In this example, the actuator 380 rotates about a second axis B that is oriented in a different direction (e.g., along the x-direction) from the rotational axis A, which is oriented along the y-direction. This configuration allows additional design freedom in that the adjustment rotor 342 is not required to be directly accessible to the user for operation. Thus, the rotor 342 could be located on the inner side of the panel body 318. In addition, user interaction with the rotor 342 can be located away from the rotor, such as at an end or bottom of the panel body 318 or of a vehicle door.

In this example, the actuator 380 is a screw that includes a threaded rod 382. The threaded portion of the screw 380 is coupled with the adjustment rotor 342 via a nut 384. The nut 384 is coupled with the rotor 382 in a manner that allows free rotation of the nut about a third axis C. In this example, a cylindrical portion of the nut 384 extends into and through an opening in the rotor 342 (e.g., a vertically slotted opening) to accommodate the free rotation.

When installed as part of the vehicle interior panel 310, with the rotational axis A and the screw 380 at fixed locations with respect to the underlying portion of the vehicle body, rotation of the screw 380 results in vertical translation of the post 332 with respect to the panel body 318 and corresponding translation of the panel body 318 with respect to the underlying portion of the vehicle body. With a right-handed thread in the illustrated example, clockwise rotation of the screw 380 about the axis B results in translation of the nut 384 in the x-direction (to the right in FIG. 13) and counter-clockwise rotation of the adjustment rotor 342 about the axis A. The distance D between the axis A and the interface 356 between the working surface 346 and the reaction surface 348 increases, thereby translating the post 332 of the adjustable locator 330 along the slot 344 and with respect to the panel body 318 and moving the panel body in the positive z-direction (upward in FIG. 13). In this embodiment, the rotor 342 and panel body 318 additionally include respective second working and reaction surfaces 386, 388 with an associated interface 390. The surfaces 386, 388 cooperate to translate the post 332 and move the panel body 318 in the opposite direction when the screw is turned in the opposite direction. This example also includes an optional grommet 392 located where the post 332 engages the receiver 328 of the underlying portion 326 of the vehicle body.

FIG. 15 is an exploded view of another embodiment of the adjustable locator 430, with the adjustment rotor 442 in the form of a gear and with an adjustment mechanism 440 that includes a remote actuator 480. The remote actuator 480 includes a threaded rod 482 that rotates about an axis B and operates as a worm gear in this example. The actuator 480 also includes a thumb wheel 458, which may be located so that a portion of the thumb wheel 458 is accessible from the outer side of the panel body 418, such as through an opening in the panel body. The thumb wheel 458 or other user or tool interface may be discreetly located at a bottom or side edge of the panel 410, in a location (such as in FIG. 1) that is not visible or accessible during normal vehicle use, or in a recess or cutout of the panel body such as at the bottom of a cup holder.

In this example, the post 432 and the gear 442 are not concentric (i.e., each has its own central axis), but they rotate about the same axis A. The gear 442 is fixed to and rotates with a shaft or axle 494, an outer surface of which provides the working surface 446 that interfaces with the reaction surface 448 of the panel body 418. Here, the reaction surface 448 is provided by a boss 496 fixed to the inner side 422 of the panel body (e.g., molded-in by injection molding). In another example, the gear shaft 494 is molded-in and protrudes from the inner side 422 of the panel body 418 and does not rotate with the gear. For example, the gear 442 may include a central opening that snaps onto the end of a gear shaft protruding from the inner side 422 of the panel body 418.

The post 432 of the locator 430 is fixed to the gear 442 and has an axis D that is offset from the axis A such that rotation of the gear results in rotation of the axis D about the axis A. This rotation has translational components with respect to the panel body 418 in both the x- and z-directions. When the post 432 is engaged at a fixed location with respect to the underlying portion of the vehicle body 426 in the manner of a 4-way locator, such as with receiver 428 as shown, the gear 442 and shaft 494 and their common axis A undergo rotational movement about the post 432 and axis D, translating in the x- and z-directions with respect to the vehicle body. With axis A and axis D horizontally aligned, as shown, the major component of translation is in the z-direction at small angles of movement. The radius of the gear 442 may be made sufficiently large such that small angular movement results in a sufficient amount of post translation to overcome manufacturing tolerances associated with misalignment of panel feature lines.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A vehicle interior panel for mounting to a portion of a vehicle body, the vehicle interior panel comprising:
a panel body having an outer side and an opposite inner side, the outer side facing the interior of the passenger cabin of the vehicle when mounted to said portion of the vehicle body; and
a plurality of locators extending from the inner side of the panel body and arranged to engage a corresponding plurality of receivers of the vehicle body at a fixed location with respect to said portion of the vehicle body, the locators and receivers cooperating to locate the panel body with respect to said portion of the vehicle body,
wherein the plurality of locators includes an adjustable locator comprising a post that engages a respective one of the receivers and an adjustment mechanism coupled with the post, the adjustment mechanism being operable to change the position of the post with respect to the panel body and thereby change the location of the panel body with respect to said portion of the vehicle body when mounted to said portion of the vehicle body.

2. A vehicle interior panel as defined in claim 1, wherein the adjustment mechanism comprises a working surface and the panel body comprises a reaction surface that forms an interface with the working surface, and the working surface exerts a force on the reaction surface to translate the post with respect to the panel body in response to user-initiated movement of the working surface.

3. A vehicle interior panel as defined in claim 2, wherein the adjustment mechanism comprises an adjustment rotor that includes the working surface, and the working surface exerts a force on the reaction surface to translate the post with respect to the panel body in response to user-initiated rotation of the adjustment rotor.

4. A vehicle interior panel as defined in claim 2, wherein the working surface rotates about an axis of the post during operation of the adjustment mechanism.

5. A vehicle interior panel as defined in claim 2, further comprising a recess formed in the outer side of the panel body, wherein the working surface and the interface are located in the recess.

6. A vehicle interior panel as defined in claim 1, wherein the adjustment mechanism comprises a gear coupled with the post, the gear being in contact with the panel body at an interface such that the gear exerts a force on the panel body at the interface to translate the post with respect to the panel body in response to rotation of the gear about an axis.

7. A vehicle interior panel as defined in claim 6, wherein the gear comprises teeth that provide a working surface and the panel body comprises a rack of teeth that provides a reaction surface that is in contact with the working surface at the interface.

8. A vehicle interior panel as defined in claim 1, wherein the adjustment mechanism comprises a cam surface configured to rotate about an axis of the post such that rotation of the cam surface about the axis changes the distance from the axis to an interface between the cam surface and a reaction surface of the panel body.

9. A vehicle interior panel as defined in claim 1, wherein the post is attached to the adjustment mechanism at the outer side of the panel body and extends through a slot formed through the panel body to engage said respective one of the receivers, the post being translated along the slot during operation of the adjustment mechanism.

10. A vehicle interior panel as defined in claim 1, wherein opposing surfaces of the adjustable locator and the panel body include complimentary ratcheting features that maintain the post in a desired position with respect to the panel body by preventing movement of the adjustment mechanism below a threshold value of applied force.

11. A vehicle interior panel as defined in claim 1, wherein the adjustment mechanism comprises an adjustment rotor and a threaded rod having threads that interact with the adjustment rotor to rotate the adjustment rotor about a first axis in response to rotation of the threaded rod about a second axis that is oriented in a different direction from the first axis, the post being attached to the adjustment rotor.

12. A vehicle interior panel as defined in claim 1, wherein the adjustment mechanism comprises an adjustment rotor located at the inner side of the panel body and a remote actuator operatively coupled with the adjustment rotor, the remote actuator being accessible from the outer side of the panel body and the post being attached to the adjustment rotor.

13. A vehicle interior panel as defined in claim 1, wherein the adjustable locator is a 4-way locator and is the only 4-way locator of the vehicle interior panel.

14. A vehicle interior panel as defined in claim 1, wherein said portion of the vehicle body is a portion of a vehicle door, whereby the vehicle interior panel is an interior door panel further comprising an aesthetic feature line at the outer side of the panel body that is visible from the passenger cabin of the vehicle, wherein the adjustment mechanism is operable to translate the panel body when the vehicle interior panel is mounted to said portion of the vehicle door and when the post is translated with respect to the panel body, thereby enabling alignment of the aesthetic feature line with a complimentary aesthetic feature line of an adjacent vehicle interior panel.

15. A method of aligning complimentary aesthetic feature lines in the passenger cabin of a vehicle, the method comprising the steps of:
  (a) providing a vehicle interior panel comprising a panel body and an adjustable locator extending from an inner side of the panel body, wherein at least a portion of the adjustable locator has a variable position with respect to the panel body and the panel body includes an aesthetic feature line;
  (b) mounting the vehicle interior panel to a portion of a body of the vehicle and adjacent to another vehicle interior panel having a complimentary aesthetic feature line, wherein the adjustable locator engages a receiver at a fixed location with respect to said portion of the body of the vehicle; and
  (c) adjusting the location of the panel body with respect to said portion of the body of the vehicle by changing said variable position by an amount sufficient to align the complimentary aesthetic feature lines.

\* \* \* \* \*